Patented Nov. 9, 1948

2,453,557

UNITED STATES PATENT OFFICE 2,453,557

PROCESS OF PREPARING A DISPERSION OF CARBON BLACK

Andries Voet, New York, N. Y., assignor to J. M. Huber, Incorporated, New York, N. Y., a corporation of New Jersey No Drawing. Application November 28, 1945, Serial No. 631,485

8 Claims. (Cl. 106—32)

This invention relates to a process of preparing dispersion of carbon black, and, more specifically, to a process of preparing dispersion of the granulated form of carbon black in ink vehicles to produce inks.

Carbon black, as produced by the usual manufacturing processes such as the channel process, is extremely finely divided, light and fluffy. It is extremely dusty, which makes it difficult to handle and causes contamination of the atmosphere and nearby products. It has a rather low apparent density of about 3 to 4 pounds per cubic foot. Usually, it is agitated or placed under pressure to remove some of the air and to give it an apparent density of about 12 pounds per cubic foot. In such state, it is ordinarily stored and transported in bags, resulting in economic disadvantages and often leading to a very undesirable contamination of the product with paper fibers.

It is known in the art that carbon black may be agglomerated or compacted by suitable treatments so that it is formed into small granules or pellets of a relatively high apparent density, usually up to about 24 pounds per cubic foot. In this form, it is free-flowing and substantially free of the objectionable quality of dustiness. The carbon black in this form is usually referred to in the art as compacted carbon black. It may be prepared by wet or by dry methods, such as those described in U. S. Patents 1,889,429 and 2,164,164.

Compacted carbon black pellets have been found to disperse easily in rubber due to the high shearing stresses produced in mixing them in the rubber. However, while many attempts have been made to disperse compacted carbon black pellets in liquid vehicles, as in the production of inks, such methods have heretofore been unsatisfactory, and, prior to the present invention, it has been practically universal practice to employ the dusty, fluffy type of carbon black in making inks, paints and the like. For instance, while the fluffy type of carbon black may be easily and uniformly dispersed in a liquid vehicle, such as mineral oils, vegetable drying oils and the like, on a three-roller mill, it was found that the compacted carbon black pellets collect on the back roller of a three-roller mill, forming a gummy film which resists vigorous attempts to obtain further dispersion.

It has been proposed to prepare inks and the like by grinding compacted carbon black pellets into the vehicle in a mill of the ball mill type. Such type of mill is generally not provided with means for heating, and, hence, such processes have been attempted at ordinary atmospheric temperatures of about 70° F. Such methods have not proved to be satisfactory, for the product contains objectionable high percentages of large particle agglomerates even after subjection to a very considerable period of milling.

An object of the present invention is to provide a method for the efficient, quick and economical dispersion of compacted carbon black pellets in relatively fluid vehicles. Another object is to provide an improved method of dispersing compacted carbon black pellets in a liquid vehicle by means of a mill of the ball mill type, whereby better dispersions of the carbon black are obtained, and in shorter periods of time. Other objects are to provide new compositions of matter and to advance the art. Still other objects and advantages of the invention will be apparent, as it is better understood, by reference to the following specification, in which the preferred embodiments are described.

The above and other objects may be accomplished in accordance with my invention, which comprises mixing compacted carbon black pellets with an organic substance which is liquid at 70° F., boils at a temperature substantially above 110° F. and wets carbon black, and grinding the mixture in a mill of the ball mill type at a temperature of at least 110° F. but below the boiling point of the organic liquid. I have found that, by milling the carbon black into the vehicle at such elevated temperatures, I am able to greatly shorten the period of milling required and, at the same time, to obtain a greatly improved dispersion of the carbon black.

Heretofore, it has been usual to maintain the vehicle at as high a viscosity as possible in order to increase shearing stresses and thereby increase the grinding action. Therefore, grinding at elevated temperatures would not be expected to increase the grinding efficiency due to the resultant decrease in viscosity of the vehicle. However, I have found that the compacted carbon black pellets are different and behave quite differently from the conventional pigment particles, and that the influence of temperature on the dispersion of compacted carbon black pellets is extremely great. I have found that, when a pellet of carbon black is dropped into a suitable liquid at temperatures of 110° F. and above, the pellet swells and then bursts into tiny fragments, generally more rapidly with increase in temperature. This is apparently due to the fact that the pellets are porous and the forces holding the particles together are insufficient to resist the capillary forces and other stresses created when the liquid is drawn into the pellet at these elevated temperatures. This bursting of the pellets into tiny particles greatly assists the grinding of the carbon black into the finely divided form required for the proper dispersion of the carbon black throughout the liquid vehicle.

By a mill of the ball mill type, I mean to include ball mills, pebble mills, and tube mills which are an elongated form of the ball mill. The mills of the ball mill type may employ pebbles or balls of flint, porcelain, synthetic resin, cast iron or steel, or iron or steel slugs or bars, or the like, which revolve and tumble to produce a grinding action. In the experiments hereinafter given, the mill was a steel ball mill employing steel balls.

The viscosities of the vehicles and mixtures are hereinafter given in poises as determined by the Brookfield synchrolectric viscometer.

The vehicles which may be employed in accordance with my invention are organic substances which will wet carbon and which are liquid at 70° F. and boil above the temperature of milling and preferably above 200° F. They include acetone, alcohols such as ethyl alcohol, aromatic hydrocarbons such as benzene and toluene, aliphatic hydrocarbons such as kerosene and the mineral oils generally, and vegetable drying oils such as linseed oil. My invention is particularly directed to the manufacturer of printing inks employing the usual ink vehicles such as vegetable drying oils and mineral oils. The vehicles may contain resinous and asphaltic materials and other ingredients usually employed in inks and paints. Preferably, the vehicle will have a viscosity of from about 0.25 to about 5 poises at 80° F.

The dispersion of carbon black in the vehicle, obtained in a mill of the ball mill type, takes place more rapidly and readily as the temperature rises, with a sharp improvement taking place at about 110° F. This is shown by plotting the milling time against the temperature for a given grit content. To obtain all the desirable advantages of my invention, the temperature of the milling should be at least 140° F., with the best results at about 190° F. Temperatures above 200° F. may be employed, but, due to the cost of heating and the development of undesirable pressures in the mill, will not be as desirable. For practical purposes, the temperature should be in the range of from about 140° F. to about 200° F.

The ratio of carbon black to vehicle will be dependent upon the desire of the operator and the intended use of the dispersion, and particularly on the viscosity and color strength desired in the final product. For a news ink having a mineral oil base, the carbon black should constitute from about 9% to about 14% by weight of the mixture, which will produce an ink having a viscosity of from about 10 to about 50 poises at 80° F. For a magazine news ink having a mineral oil base, the carbon black should constitute from about 14% to about 20% by weight of the mixture to produce an ink having a viscosity of from about 50 poises to about 150 poises at 80° F. In practice, it will generally be desirable to grind a mixture of carbon black pellets and mineral oil in which the carbon black pellets constitute about 28% by weight of the mixture in order to provide a concentrated ground mixture which may be thereafter diluted to any desired strength.

The ratio of the carbon black to the vehicle employed will also depend upon the viscosity of the vehicle and on the temperature of the milling. The viscosity of the mixture increases with improvement in the dispersion so that the final ground mixture is more viscous than before milling. In order for the balls to cascade freely and grind efficiently and in order to permit ready discharge of the mill when the mill has a diameter of about 12 inches, the viscosity of the mixture should not rise substantially above 50 poises at the temperature of milling. With larger mills, higher viscosities, up to about 110 poises, are permissible. The ratio of carbon black to vehicle should be regulated accordingly.

The time of milling will be dependent upon the degree of dispersion desired, on the vehicle and on the ratio of carbon black to vehicle. In all cases, the time, required to produce particular results, will be greatly decreased by increase in the temperature in accordance with my invention. For producing inks, the time of milling will usually be that which will be sufficient to reduce the grit to 0.02% or less, and preferably to less than 0.01%.

In the following series of tests, I have compared the effect of the temperature on the dispersion of carbon black in a steel ball mill of about 12 inches in diameter, by comparing various properties of the dispersions made at different temperatures.

The dispersion was made by mixing 85 parts by weight of a mineral oil of a viscosity of 0.95 poises at 80° F. with 3 parts of a varnish, consisting of 1 part of a modified wood rosin dissolved at a temperature above its melting point in 2 parts of a mineral oil of a viscosity of 3.9 poises at 80° F. To this vehicle, which had a viscosity of 2.7 poises at 80° F., 12 parts by weight of carbon black pellets were added and the mixture was heated to a predetermined temperature, after which it was subjected to ball mill grinding at the indicated temperature. The composition is such that the balls cascade freely even at the lowest temperature.

In order to follow the degree of dispersion, a determination was made of the weight percentage of particle agglomerates which were retained on a 325 mesh screen, after dilution with a suitable solvent such as kerosene, benzene, toluene, and xylol, and which agglomerates are referred to as grit.

Another method for evaluating the progress of the dispersion process is the examination of a draw-down of the dispersion made in an engraved wedge-shaped depression of continuously increasing depth in a steel plate. The steel plate used had a depression width of ⅜ inch with a depth at the deep end of 0.003 inch and a length of 7.5 inch. It was arbitrarily numbered from 0–20. The top, at zero depth, was given the number 0 and consecutive full numbers were indicated at each ⅜ inch interval, the deep end thus being given the number 20. A few drops of ink, placed at the deep end of the wedge, were drawn with a flat steel scraper, toward the shallow end. Grit, when sufficiently large, was drawn with the scraper. The presence and relative size of grit is indicated by the scale number of the wedge at which "pinheads" or scratches in the film made their first appearance. A high number indicates the presence of large agglomerates and a poor dispersion, while a lower number indicates a better dispersion. Dispersions, which are characterized by a number 14 or lower, are considered adequately dispersed for use in certain printing inks, generally used for the printing of newspapers and similar publications.

Table #1 shows the effect of time and temperature on the percentage by weight of the dispersion retained on a 325 mesh screen.

TABLE 1
*Rate of dispersion at different temperatures*

|  | 80° F. | 110° F. | 140° F. | 170° F. | 200° F. |
|---|---|---|---|---|---|
| Hours for 0.05% grit | 7.7 | 4.6 | 4.3 | 4.2 | 4.0 |
| Hours for 0.02% grit | 10 | 6.2 | 5.8 | 5.5 | 5.4 |
| Hours for 0.01% grit | 11.2 | 9.0 | 7.5 | 6.3 | 6.1 |

Table #2 indicates the effect of time and temperature on the wedge number of the dispersion.

TABLE 2
*Effect of temperature on wedge number*

| Hours | 2 | 4 | 6 | 8 |
|---|---|---|---|---|
| Wedge No. for 80° F | 19 | 19 | 17 | 16 |
| Wedge No. for 110° F | 19 | 19 | 17 | 15 |
| Wedge No. for 140° F | 19 | 18 | 15 | 14 |
| Wedge No. for 170° F | 19 | 16 | 13.5 | 12.5 |
| Wedge No. for 200° F | 19 | 14 | 12 | 11 |

These experiments clearly show the great influence of the temperature on the grinding time necessary to reach a satisfactory dispersion. An acceptable news ink is obtained in 4 hours at 200° F., in about 5 hours at 170° F., and in 8 hours at 140° F., and increases rapidly with decreasing temperatures, up to 12 hours at 110° F. and 24 hours at 80° F.

It is also observed that the grinding time, necessary to reach a predetermined particle size distribution with the indicated "grit" percentages, decreases very rapidly with the temperature and 0.01% grit is reached at 170° F. in a little more than half the time required at 80° F.

A similar set of experiments was conducted in which the varnish was replaced with a mineral oil having a viscosity of 3.9 poises at 80° F. so that the effects of the varnish were eliminated. The results are shown in Table #3.

TABLE 3
*Rate of dispersion in absence of varnish*

| Grinding Temp. | Percent Grit on 325 Mesh | | | |
|---|---|---|---|---|
|  | 2 hrs. | 4 hrs. | 6 hrs. | 8 hrs. |
| 110° F | .570 | .210 | .045 | .029 |
| 140° F | .410 | .127 | .023 | .018 |
| 170° F | .389 | .113 | .020 | .013 |

These results also show that high temperature grinding causes a rapid decrease in grit.

Grinding at a high temperature reduces the viscosity of the batch and for this reason tends to slow down the grinding action. In some cases it has been found to be advantageous to withhold a part of the vehicle during the grinding operation, thus providing for a more viscous grinding medium with correspondingly higher rates of shear and shorter grinding times, while the withheld part of the vehicle is mixed in at the end of the run. By operating according to this schedule, still shorter grinding periods are possible at the higher temperatures than those indicated in the previous experiments and it becomes obvious that the method of my invention is a process which is considerably more economical than previous methods, allowing a much greater production with considerably less power and labor consumption per unit of weight of the dispersion than before.

While in the examples indicated above only mineral oil vehicles were used, similar results were obtained with other vehicles such as vegetable drying oils, solutions and dispersions of resinous materials in various oils, etc. The temperature effect proved to be independent of the nature of the vehicle, and in each case an increase in grinding temperatures results in a decreased grinding period necessary to obtain the same degree of dispersion.

I claim:

1. The process of preparing a dispersion of carbon black in an organic substance which comprises mixing compacted carbon black with an organic substance which is liquid at 70° F., boils at a temperature substantially above 140° F. and wets carbon black, and grinding the mixture in a mill of the ball mill type at a temperature of from about 140° F. to about 200° F. but below the boiling point of the organic liquid.

2. The process of preparing a dispersion of carbon black in an organic substance which comprises mixing compacted carbon black with an organic substance which is liquid at 70° F., boils at a temperature substantially above 200° F. and wets carbon black, and grinding the mixture in a mill of the ball mill type at a temperature of about 190° F.

3. The process of preparing an ink which comprises mixing compacted carbon black with an ink vehicle which is liquid at 70° F. and boils at a temperature substantially above 200° F., and grinding the mixture in a mill of the ball mill type at a temperature of from about 140° F. to about 200° F.

4. The process of preparing an ink which comprises mixing compacted carbon black with an ink vehicle which is liquid at 70° F. and boils at a temperature substantially above 200° F., and grinding the mixture in a mill of the ball mill type at a temperature of about 190° F.

5. The process of preparing an ink which comprises mixing compacted carbon black with a mineral oil vehicle which is liquid at 70° F. and boils at a temperature substantially above 200° F., and grinding the mixture in a mill of the ball mill type at a temperature of from about 140° F. to about 200° F.

6. The process of preparing an ink which comprises mixing compacted carbon black with a mineral oil vehicle which is liquid at 70° F. and boils at a temperature substantially above 200° F., and grinding the mixture in a mill of the ball mill type at a temperature of about 190° F.

7. The process of preparing an ink which comprises mixing compacted carbon black with a mineral oil vehicle which is liquid at 70° F. and boils at a temperature substantially above 200° F., and grinding the mixture in a mill of the ball mill type at a temperature of from about 140° F. to about 200° F., the carbon black constituting from about 9% to about 28% by weight of the mixture and insufficient to give the ground product a viscosity substantially above 50 poises at the temperature of grinding.

8. The process of preparing an ink which comprises mixing compacted carbon black with a mineral oil vehicle which is liquid at 70° F. and boils at a temperature substantially above 200° F., and grinding the mixture in a mill of the ball mill type at a temperature of about 190° F., the carbon black constituting from about 9% to about 28% by weight of the mixture and insufficient to give the ground product a viscosity substantially above 50 poises at the temperature of grinding.

ANDRIES VOET.

REFERENCES CITED

The following references are of record in the file of this patent:

UNITED STATES PATENTS

| Number | Name | Date |
|---|---|---|
| 1,992,290 | Cawood | Feb. 26, 1935 |
| 2,045,006 | Wiegand | June 23, 1936 |
| 2,121,535 | Amon | June 21, 1938 |
| 2,167,674 | Offutt | Aug. 1, 1939 |
| 2,212,641 | Hucks | Aug. 27, 1940 |
| 2,361,059 | Robertson | Oct. 24, 1944 |

OTHER REFERENCES

"The Paint Grinders Black Art," Binney & Smith Co. (1930), pp. 13–18, 41 East 42d Street, New York, N. Y.